United States Patent [19]

Eschbach

[11] Patent Number: 5,278,670
[45] Date of Patent: Jan. 11, 1994

[54] CONTENT-BASED RESOLUTION CONVERSION OF COLOR DOCUMENTS

[75] Inventor: Reiner Eschbach, Webster, N.Y.

[73] Assignee: Xerox Corporation, Stamford, Conn.

[21] Appl. No.: 995,652

[22] Filed: Dec. 18, 1992

[51] Int. Cl.⁵ .................... H04N 1/387; H04N 1/40
[52] U.S. Cl. .................... 358/453; 358/448; 358/455; 358/462
[58] Field of Search .............. 358/401, 429, 448, 453, 358/455, 456, 462, 465, 500, 501, 505, 536, 537, 538

[56] References Cited

U.S. PATENT DOCUMENTS

| | | | |
|---|---|---|---|
| 3,294,896 | 12/1966 | Young, Jr. | 358/283 |
| 4,149,194 | 4/1979 | Holladay | 358/283 |
| 4,194,221 | 3/1980 | Stoffel | 358/283 |
| 4,251,837 | 2/1981 | Janeway, III | 358/283 |
| 4,509,195 | 4/1985 | Nadler | 358/284 |
| 4,547,811 | 10/1985 | Ochi et al. | 358/283 |
| 4,556,918 | 12/1985 | Yamazaki et al. | 358/283 |
| 4,559,563 | 12/1985 | Joiner, Jr. | 358/283 |
| 4,577,235 | 3/1986 | Kannapell et al. | 358/462 |
| 4,578,714 | 3/1986 | Sugiura et al. | 358/283 |
| 4,730,221 | 3/1988 | Roetling | 358/283 |
| 4,736,253 | 4/1988 | Shida | 358/283 |
| 4,811,115 | 3/1989 | Lin et al. | 358/283 |
| 4,829,370 | 5/1989 | Mayne et al. | 358/537 |
| 4,930,007 | 5/1990 | Sugiura | 358/462 |
| 5,045,952 | 9/1991 | Eschbach | 358/447 |
| 5,109,282 | 4/1992 | Peli | 358/465 |
| 5,208,871 | 5/1993 | Eschbach | 358/456 |
| 5,231,519 | 7/1993 | Koike | 358/456 |

FOREIGN PATENT DOCUMENTS

2153619  8/1985  United Kingdom .......... H04N 1/40

OTHER PUBLICATIONS

Floyd and Steinberg, "An Adaptive Algorithmn for Spatial Greyscale", Proceedings of the SID 17/2, 75–77 (1976).

Billotet-Hoffmann and Bryngdahl, "On the Error Diffusion Technique for Electronic Halftoning", Proceedings of the SID, vol. 24/3, pp. 253–258, (1983).

M. Schroeder, "Images from Computers", IEEE Spectrum; Mar. 1969, pp. 66–78.

*Primary Examiner*—Edward L. Coles, Sr.
*Assistant Examiner*—Jerome Grant, II
*Attorney, Agent, or Firm*—Mark Costello

[57] ABSTRACT

An image processing system for preparing a document for printing, receives document images containing pictures and text at a first resolution which cannot be rendered by a selected printer. In such a system, there is provided an arrangement for determining the presence or absence of a constant gray level over a small area of the document in each separation, and among the separations. Subsequent to such determination, a control signal representing the determination is produced that provides a selection of resolution conversion functions, one of which preserves gray density, and the other of which does not.

6 Claims, 7 Drawing Sheets

FIG. 1B

| R=0<br>G=255<br>B=0 | R=0<br>G=255<br>B=57 | R=85<br>G=227<br>B=85 | R=255<br>G=170<br>B=85 | R=255<br>G=0<br>B=0 | R=255<br>G=573<br>B=0 | R=170<br>G=57<br>B=28 |
|---|---|---|---|---|---|---|
| R=0<br>G=170<br>B=0 | R=57<br>G=227<br>B=0 | R=113<br>G=227<br>B=0 | R=170<br>G=170<br>B=0 | R=170<br>G=0<br>B=0 | R=170<br>G=0<br>B=0 | R=142<br>G=28<br>B=0 |
| R=0<br>G=0<br>B=0 | R=170<br>G=170<br>B=0 | R=170<br>G=170<br>B=0 | R=0<br>G=0<br>B=0 | R=0<br>G=0<br>B=0 | R=0<br>G=0<br>B=0 | R=85<br>G=85<br>B=0 |
| R=255<br>G=0<br>B=0 | R=255<br>G=0<br>B=170 | R=255<br>G=85<br>B=255 | R=255<br>G=255<br>B=255 | R=0<br>G=255<br>B=0 | R=0<br>G=85<br>B=0 | R=85<br>G=0<br>B=85 |
| R=255<br>G=0<br>B=0 | R=255<br>G=0<br>B=170 | R=255<br>G=85<br>B=255 | R=255<br>G=255<br>B=255 | R=0<br>G=255<br>B=0 | R=113<br>G=198<br>B=0 | R=142<br>G=113<br>B=85 |

FIG. 1A

| R=255<br>G=255<br>B=255 | R=255<br>G=255<br>B=255 | R=255<br>G=255<br>B=255 | R=255<br>G=255<br>B=255 | R=0<br>G=0<br>B=0 | R=0<br>G=0<br>B=0 | R=0<br>G=0<br>B=0 |
|---|---|---|---|---|---|---|
| R=255<br>G=255<br>B=255 | R=255<br>G=255<br>B=255 | R=255<br>G=255<br>B=255 | R=255<br>G=255<br>B=255 | R=0<br>G=0<br>B=0 | R=0<br>G=0<br>B=0 | R=0<br>G=0<br>B=0 |
| R=255<br>G=255<br>B=255 | R=255<br>G=255<br>B=255 | R=255<br>G=255<br>B=255 | R=255<br>G=255<br>B=255 | R=170<br>G=170<br>B=170 | R=57<br>G=57<br>B=57 | R=0<br>G=0<br>B=0 |
| R=170<br>G=170<br>B=170 | R=170<br>G=170<br>B=170 | R=170<br>G=170<br>B=170 | R=170<br>G=170<br>B=170 | R=170<br>G=170<br>B=170 | R=57<br>G=57<br>B=57 | R=0<br>G=0<br>B=0 |
| R=0<br>G=0<br>B=0 | R=0<br>G=0<br>B=0 | R=0<br>G=0<br>B=0 | R=0<br>G=0<br>B=0 | R=0<br>G=0<br>B=0 | R=0<br>G=0<br>B=0 | R=0<br>G=0<br>B=0 |

CONTENT-BASED RESOLUTION CONVERSION OF COLOR DOCUMENTS

This invention relates to resolution conversion in color documents, and more particularly, a method and apparatus for accomplishing resolution conversion in color documents, taking into account document content.

BACKGROUND OF THE INVENTION

Document image information, be it color or black and white, is commonly generated in a bitmap format at a particular scale, orientation $\Theta$ and resolution $K \times L \times b$, corresponding to a desired printer capability, where K is a number of spots printable per unit of length in one dimension, L is a number of spots printable per unit length in the other dimension, and b is the depth of each pixel, in number of possible levels. This bitmap is present for every color separation printed at the output device, i.e., 4 bitmaps for a 4-color output device, 3 for a 3-color, 2 for a 2-color and 1 for a black and white output device. In a common example of a black and white print output, document image data comprising a bitmap to be printed is provided to a printer suitable for printing at 300 spots per inch (spi) in both dimensions, at a one bit depth giving 2 levels. Many considerations drive this single selection of resolution, including the desirability of providing only a limited number of fonts (alphanumeric bitmaps) so as to use only a limited amount of storage space. Common software packages available on personal computers or for operation of input scanners for document creation, also usually provide only a single resolution output.

Increasingly, the resolution available from printers varies over a wider range of choices. Printer resolutions are available over a range, for example, from less than 200 spi to more than 600 spi. Resolutions vary for a number of reasons, generally related to the quality of the output image. Simply printing a 300 spi bitmap at 400 spi or 600 spi is undesirable however, since the image will be reduced substantially in size on the output page or display. It would be highly desirable to provide the capability of printing color documents at any resolution.

Most documents can be classified as having pictures and text or line art. Pictures or pictorial images, are represented in such systems with varying levels of gray to capture detailed content. If the image has been scanned at an image input terminal, the gray levels will be voltage gradations varying between a minimum and a maximum. If the image is further halftoned, the pictorial image will be represented through the use of dithering or halftoning processes. In such arrangements, over a given area having a number of gray pixels therein, each pixel value of an array of gray pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that, for an area where the image is gray, some of the thresholds within the dither matrix will be exceeded, i.e. the image value at that specific location is larger than the value stored in the dither matrix for that same location, while others are not. In the binary case, the pixels or cell elements for which the thresholds are exceeded might be printed as black, while the remaining elements are allowed to remain white, dependent on the actual physical quantity described by the data.

Text or line art is represented in color systems as areas where all the pixels are at a minimum or maximum. In a black and white, 256 level graphics system, text and line art would be represented typically by either a 0 or 255, where each level represents a distinct gray between black and white. In color systems, black may be alternatively represented as either black or white, or as equal amounts of cyan, magenta and yellow colorants, which together form gray. If the text is colored, colors will usually be uniform throughout the text area.

It is highly desirable to use a halftoning process that preserves gray density in rendering pictorial images. Algorithms that convert gray images to binary or other number of level images for printing and which attempt to preserve the local density exist, and include among them error diffusion, as taught, for example, in "An Adaptive Algorithm for Spatial Greyscale" by Floyd and Steinberg, Proceedings of the SID 17/2, 75-77 (1976) (hereinafter, "Floyd and Steinberg"). Another, more elaborate method would be the error diffusion techniques of U.S. Pat. No. 5,045,952, entitled "Method for Edge Enhanced Error Diffusion Algorithm" by R. Eschbach, which serves to provide image dependent edge enhancement, assigned to the same assignee as the present invention. Error diffusion attempts to maintain gray by making the conversion from gray pixels to binary or other level pixels on a pixel-by-pixel basis. The procedure examines each pixel with respect to a threshold, and the difference between the gray level pixel value and the output value is forwarded to a selected group or set of neighboring pixels, in accordance with a weighting scheme. Such forwarding of error is undesirable in the case of text, which requires sharp contrast at edges of legibility. Generally speaking, preservation of accurate gray density is not an important factor in rendering text. Other error diffusion methods include, "On the Error Diffusion Technique for Electronic Halftoning" by Billotet-Hoffmann and Bryngdahl, Proceedings of the SID, Vol. 24/3, (1983), pp. 253-258; and U.S. patent application Ser. No. 07/821,125 entitled "Method for Image Conversions With Error Diffusion", by R. Eschbach, (EPC 0 481 812 A2). A technique related to error diffusion is taught in the MAE (Minimum Average Error) method of error diffusion described in "Images from Computers", by M. Schroeder, IEEE Spectrum, March 1969, pp. 66-78, in which an error correction is performed that only affects a local neighborhood. This method does not preserve the gray density.

Segmentation of images based on image content as a means to determine optimal image processing is known, as shown in U.S. Pat. No. 4,811,115 to Lin et al, U.S. Pat. No. 4,194,221 to Stoffel and U.S. patent application Ser. No. 07/722,568 to Shiau et al., assigned to the same assignee as the present invention. However, all of these methods use variations of the auto correlation function to determine whether certain frequencies of halftones are present. GB 2,153,619A provides a similar determination of the type of image data. However in that case, a threshold is applied to the image data at a certain level, and subsequent to thresholding the number of transitions from light to dark within a small area is counted. The system operates on the presumption that data with a low number of transitions after thresholding is probably a high frequency halftone or continuous tone image. The thresholding step in this method has the same undesirable effect as described for Stoffel.

Of background interest in this area are U.S. Pat. No. 4,556,918 to Yamazaki et al. showing an arrangement assuming a periodicity of an area of halftone dots which are thresholded against an average value derived from the area to produce a density related video signal; U.S. Pat. No. 4,251,837 to Janeway, Ill., which shows the use of a three decision mode selection for determining threshold selection based on gradient constants for each pixel; U.S. Pat. No. 4,578,714 to Sugiura et al. which shows random data added to the output signal to eliminate pseudo-outlines; U.S. Pat. No. 4,559,563 to Joiner, Jr. suggests an adaptive prediction for compressing data based on a predictor which worked best for a previous pixel block; and U.S. Pat. No. 3,294,896 to Young, Jr. teaches the usefulness of thresholding in producing an image from a binary digital transmission system.

U.S. Pat. No. 4,509,195 to Nadler describes a method for binarization of a pattern wherein two concentric rings around a pixel are evaluated to determine contrast values, and the contrast values are used then to determine whether the pixel and the surrounding areas have a light or dark quality. U.S. Pat. No. 4,547,811 to Ochi et al. teaches a method of processing gray level values, depending on the density level of blocks of pixels, and their difference from a minimum or maximum value. The blocks are then processable by a halftone processing matrix depending on the difference value. U.S. Pat. No. 4,730,221 to Roetling discloses a screening technique where values of gray over an image are evaluated to determine a minimum and maximum level, in order to determine constant levels of gray. U.S. Pat. No. 4,736,253 to Shida discloses a method of producing a halftone dot by selectively comparing image signals with highlight and shadow reference values, for determination of the binarization process.

Figure 1A:
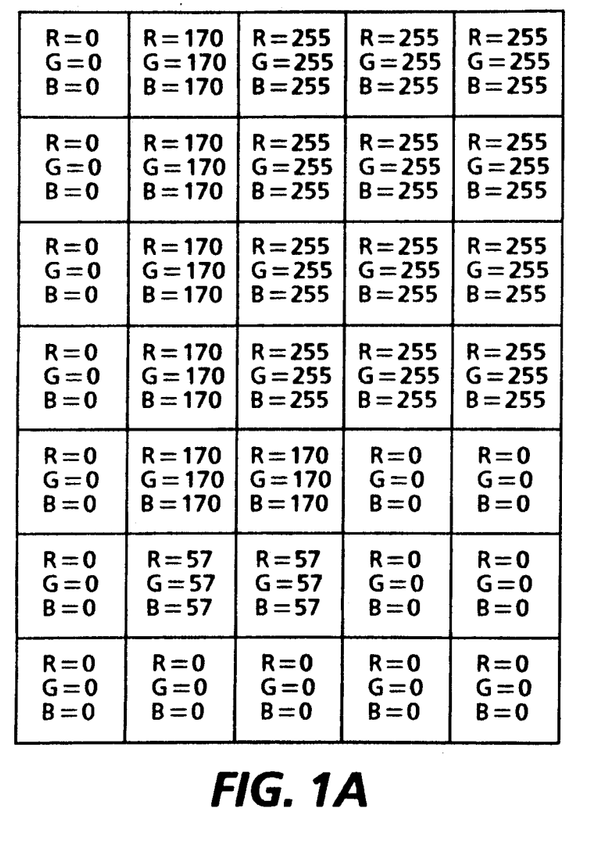
FIG. 1A and 1B show portions of text images and portions of pictorial images demonstrating correlation therein.
Figure 1B:
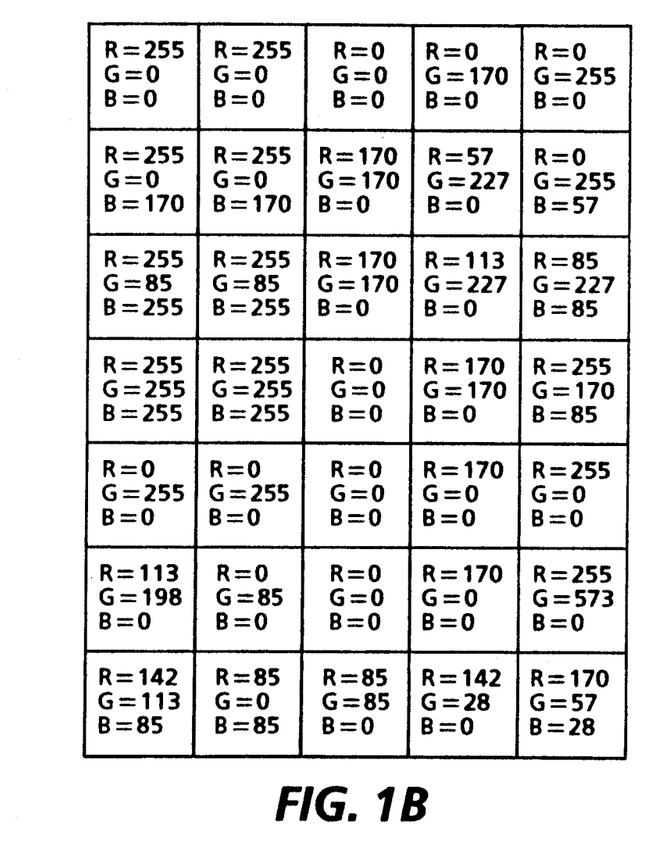

Study of documents created by users of color printing systems yields certain interesting phenomenon. First, even when color pictures are present in a document, for the most part, black text is used. Further, in the unusual case that black text is not used, the color in which text is rendered does not vary within a given area. Thus, when text is used, an examination of a given area of a color document including text will show either a) high correlation within the area within the separation, and b) high correlation between separations. Pictorial areas do not show such correlations. FIG. 1A and FIG. 1B show examples of small areas of documents, illustrating this observation. Note that the colors are given in terms of an additive system, commonly used in scanners and for displays, but a subtractive system, commonly used in printers, gives the same results.

All of the references cited herein are incorporated by reference for their teachings.

SUMMARY OF THE INVENTION

In accordance with the invention, there is provided a method of preparing a document containing pictorial images and text for printing, by determining the data type and using an optimal resolution conversion process.

In accordance with one aspect of the invention, there is provided an image processing system for preparing a document for printing which receives document images containing pictures and text at a first resolution which cannot be rendered by a selected printer. In such a system, there are provided means for determining the presence or absence of a constant gray level over a small area of the document in each separation, and among the separations. Subsequent to such determination, a control signal representing the determination is produced, that provides a selection of resolution conversion functions, one of which preserves gray density, and the other of which does not. "Gray", as used herein does not refer to a color unless specifically identified as such. Rather, the term refers to image signals which vary between maximum and minimum, irrespective of the color of the separation in which the signals are used.

In accordance with another aspect of the invention, there is provided a method of determining the presence of text or line art within a given area, which includes the steps of: a) selecting a small area of a colored document; b) determining for each separation forming the color document whether such area is uniformly gray; c) determining whether for all the separations, the area was uniformly gray; and d) producing a signal indicative of the determination.

In accordance with yet another aspect of the invention, a useful resolution conversion process that retains gray density within an area is given by the process steps: a) simulating printing the document at the first printer for which the image was prepared for printing; b) simulating scanning of the simulated printed document with an aperture corresponding to the desired output; c) reducing the simulated scanned document, which contains gray data, to a print-ready condition by reducing the number of gray levels defining the pixel to a number of levels corresponding to possible printer output responses using error diffusion methods that maintain the local area gray density level or by other binarization or quantization techniques, such as dithering, that follow the same principle of local area density preservation.

In accordance with still another aspect of the invention, a useful resolution conversion process that does not retain gray density within an area is given by the process steps a) simulating printing the document at the first printer for which the image was prepared for printing; b) simulating scanning of the simulated printed document with an aperture corresponding to the desired output; c) reducing the simulated scanned document, which contains gray data, to a print-ready condition by reducing the number of gray levels defining the pixel to a number of levels corresponding to possible printer output responses using a threshold process which renders lighter shades of gray as white, and darker shades of gray as black.

These and other aspects of the invention will become apparent from the following descriptions to illustrate a preferred embodiment of the invention read in conjunction with the accompanying drawings in which:

Figure 2A:
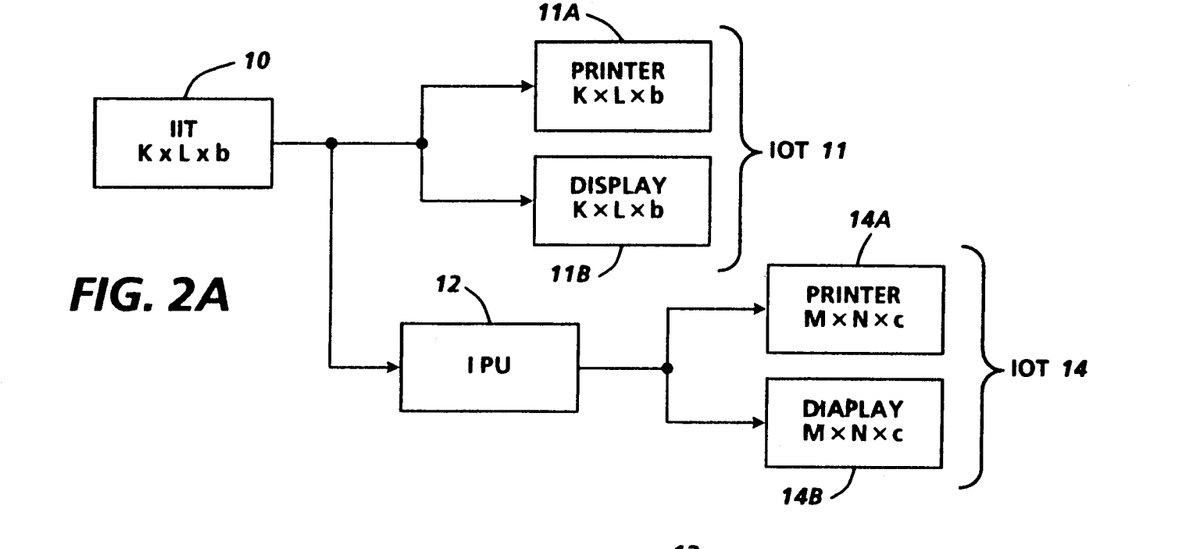
FIG. 2A is a block diagram showing an image processing system in which the present invention may find use and FIG. 2B is a block diagram showing a resolution conversion system which is useful in the image processing system of FIG. 2A.

Referring now to the drawings where the showings are for the purpose of describing an embodiment of the invention and not for limiting same, a basic image processing system is shown in FIG. 2a. In the present case, a document from an image input terminal may be characterized as a set of image signals, each discrete signal or pixel of which is defined at a single level or optical density in a set of b optical density levels. In one example, a signal has a maximum value or a minimum value in a binary system, where there are two possible optical density levels. Each pixel corresponds to a driving signal for an output device such as a printer, or display. Printers are inherently limited by physical constraints in their use of image data, such that they can place only a predetermined number of spots per inch in either a slow or fast scan direction (x- or y-axes). Therefore, image signals are generated for printing at a spatial resolution of $K \times L$, usually fixed for a printer. If a printer is set to operate at a spatial resolution of $M \times N$, different than $K \times L$, the image signals will not drive the printer to correctly reproduce the image. Accordingly, an intermediate image processing system is required to prepare the $K \times L$ image for printing on the $M \times N$ printer.

In the particular color system to be discussed, color documents are represented by multiple sets of image signals, each set (or separation) represented by an independent channel, which is processed independently. A "color image" as used herein is therefore a document including at least two, as in the Xerox 4850 highlight color printer, and commonly three or four separations, such as in the Xerox 4700 Color Laser Printer, each separation providing a set of image signals which will drive a printer to produce one color of the image, which separations together form the full color image. In this context, we will describe pixels as discrete image signals, which represent optical density of the document image in a given small area thereof. The term "pixel" will be used to refer to such an image signal in each separation, as distinguished from "color pixel", which is the sum of the color densities of corresponding pixels in each separation.

One suitable printing system might be a color laser printer, such as the Xerox 4700 Color Printer. The particular invention also contemplates use with display systems, in which a document is displayed on a display screen.

With reference now to FIG. 2A, which shows a general system requirement representing the goal of the invention, an electronic representation of a document, (hereinafter, an image) from image input terminal 10 having a spatial resolution and pixel depth of $K \times L \times b$ is derived in some manner that makes the data suitable for reproduction on a specified Image Output Terminal (IOT) 11 which might be a printer 11a or a display 11b or the like. Since this is a color document, the image has two or more separations with identical resolution and pixel depth. In a large number of cases, the data is alternatively directed through an image processing unit (IPU) 12 to be processed so that an image suitable for reproduction on IOT 14 with resolution $M \times N \times c$ is achieved, where the IOT might take the form of a display 14a, printer 14b or the like operating at the resolution and pixel depth.

Figure 2B:
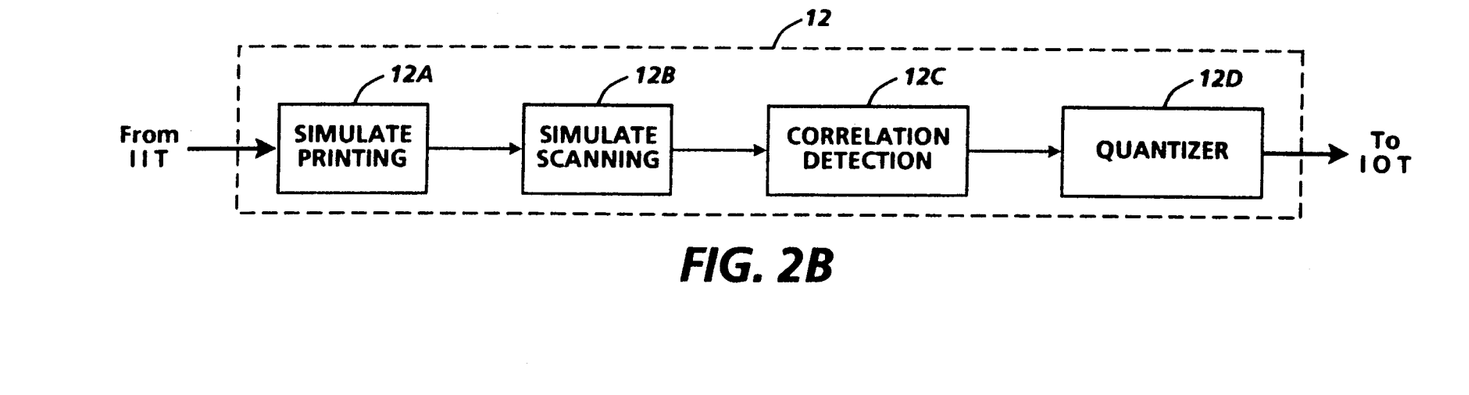

FIG. 2B is a functional block diagram of IPU 12 for resolution conversion purposes, following the scheme of simulating printing at IOT 11 at block 12a, simulating scanning at block 12b to obtain resolution $M \times N$, detecting inter- and intra color separation correlation at block 12c and, dependent on the detection in block 12c, performing quantization in block 12d to generate output spots or printer driving signal, each spot printable at one of 'c' levels. Blocks 12a, 12b and a correlation independent form of block 12d, of IPU 12 are fully discussed at U.S. patent application Ser. No. 07/821,125 entitled "Method for Image Conversions With Error Diffusion", by R. Eschbach (published as EPC 0 481 812 A2), and herein incorporated by reference. The described invention is an improvement on said application in as far as it encompasses an optimized thresholding for image and text data based on detected inter- and intra-color separation correlation.

Figure 3:
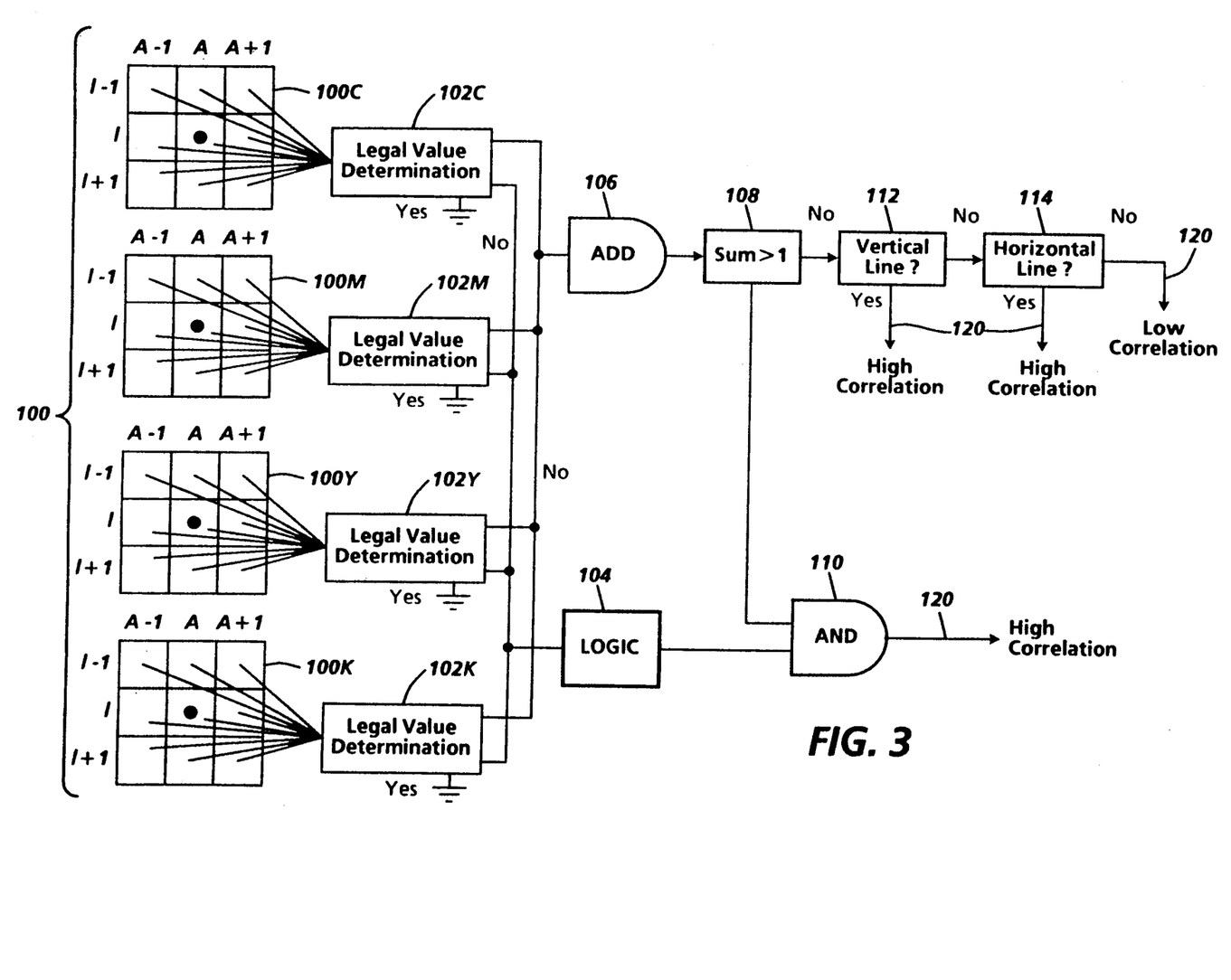
FIG. 3 shows the text/picture determination that produces the correlation signal that controls selection of quantization functions.

With reference now to FIG. 3, document images of the type contemplated are derived and directed first to a sample buffer 100, comprised of scan line buffers 100c, 100m, 100y, and 100k which hold a sample of the color image. The sample refers to a small area of the color document extending in the fast scan direction a distance corresponding to some small number of color pixels, and in the slow scan direction to a distance corresponding to a similarly small number of scan lines. The sample is not necessarily square, as there is no requirement for resolution to be identical in both the fast scan and slow scan directions. The sample selected as a sufficiently small area of judgment, in which 1) pictorial images are likely to show density variations, and 2) line art and text are likely to be uniformly correlated. In selecting the sample size, as the sample area grows larger, it will begin to include text and background, and falsely indicate lack of correlation. As the area grows smaller, it will begin to show as uniform, slowly varying pictorial area. Within these limits however, the size of the sample area is variable. Note, however, that not all pixels of the sample area have to be used for the correlation determination. Thus, a selection of color pixels within the sample could be used in accordance with the invention. The example of FIG. 3 shows a $3 \times 3$ sample, for simplicity of the illustration.

As a first optional function in the process, each pixel in the sample is compared to the set of legal output or printer values, to determine whether that pixel is a member of the set of legal output values 'd'. If none of the separations contain non-legal value pixels, the previous correlation estimation is preserved.

The correlation detector 12c of FIG. 2B, for which a functional block diagram is shown at FIG. 3, first determines which of the separation (in this case, 4 separations) samples stored at buffer 100 contain gray values that are not members of the set of legal output values 'd'. This function is provided with a logic function identified as Legal Value Determination 102c, 102m, 102y and 102k which compares the gray level values selected from the stored sample, with each of the members of the set of 'd' legal output values. Thus, for example, in a case of conversion from an 8 bit, 256 member set of input signals to a binary output signal, each input signal is compared with 0 or 255. If each signal in a separation sample has a legal output value (i.e., all the values are either 0 or 255), then no further action is taken with respect to that separation sample. Legal Value Determination 102c, m, y, k also converts all gray values to binary 0's and all legal values to 1, for reasons that will become clearer hereinafter. However, for each separation sample in which a gray level value is found, an output signal representing such a determination (for example, a binary 1,0) is directed to Logic 104, which will be further explained in respect to FIG. 4, and adder 106. Logic 104 determines whether, within the sample, all of the separations have gray in the sample area, and produces a signal to AND gate 110 indicative of that result. Adder 106 provides a value indicating whether one or more separations have gray within the sample area, and produces a signal indicative of that sum. Comparator 108 determines from the output signal of adder 106 whether more than one separation has gray values, and produces a signal (for example, a binary 1,0) indicative of that condition to AND gate 110. Thus, the output of AND gate 110 indicates high correlation within the sample area, and produces a high correlation signal. If comparator 108 produces a signal indicating that only one separation has gray values, then a spatial correlation detector is used to determine whether that local neighborhood consists of a vertical edge (block 112) or horizontal edge (block 114) in which cases high correlation is signaled, and otherwise a low correlation signal is produced. Note, that the spatial correlation detector might also be used in cases where more than 1 separation is indicated as having non-legal values.

Figure 4:
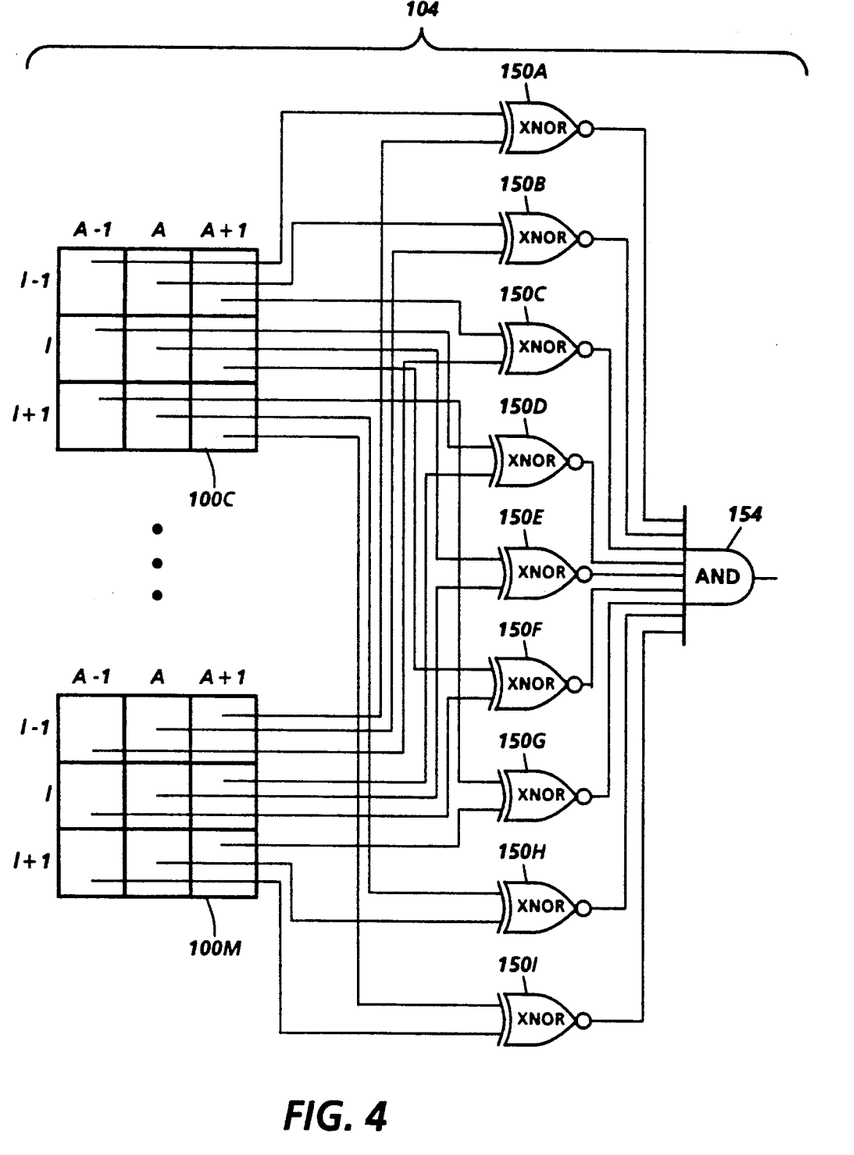
FIG. 4 shows interseparation correlation determination useful in the determination of FIG. 3.

With reference now to FIG. 4, Logic 104 of FIG. 3 performs a pixel-by-pixel comparison of the samples of each color separation that have been determined to contain non-legal values by the Legal Value Determination 102 $c,m,y,k$. FIG. 4 shows the case where only two separations have been found to contain non-legal values. For a $3 \times 3$ sample, nine XNOR gates 150a through 150i provide a logical function, where a legal value input value from Legal Value Determination 102 $c,m,y,k$, in this example, is considered to be represented by a logical '1' and a non-legal or gray level value by a '0'. The output of each of the comparators 150a–i logical function is a binary signal '1' if all separations have a legal value at that position, a binary signal '1' if all separations have a non-legal value at that position, and a binary signal '0' if both legal and non-legal values occur at that position in the sample (sometimes this relationship is referred to as exclusive-NOR logic (XNOR). The output of XNOR gates 150 (a through i) is directed to AND gate 154, which determines whether all comparators 302a–i have produced a logic state '1'. Upon such a determination, and with reference to FIG. 3, a logical 1 is produced as an output signal to AND gate 110, which in this instance, because plural separations include non-legal values, produces an output signal indicating high correlation.

Figure 5:
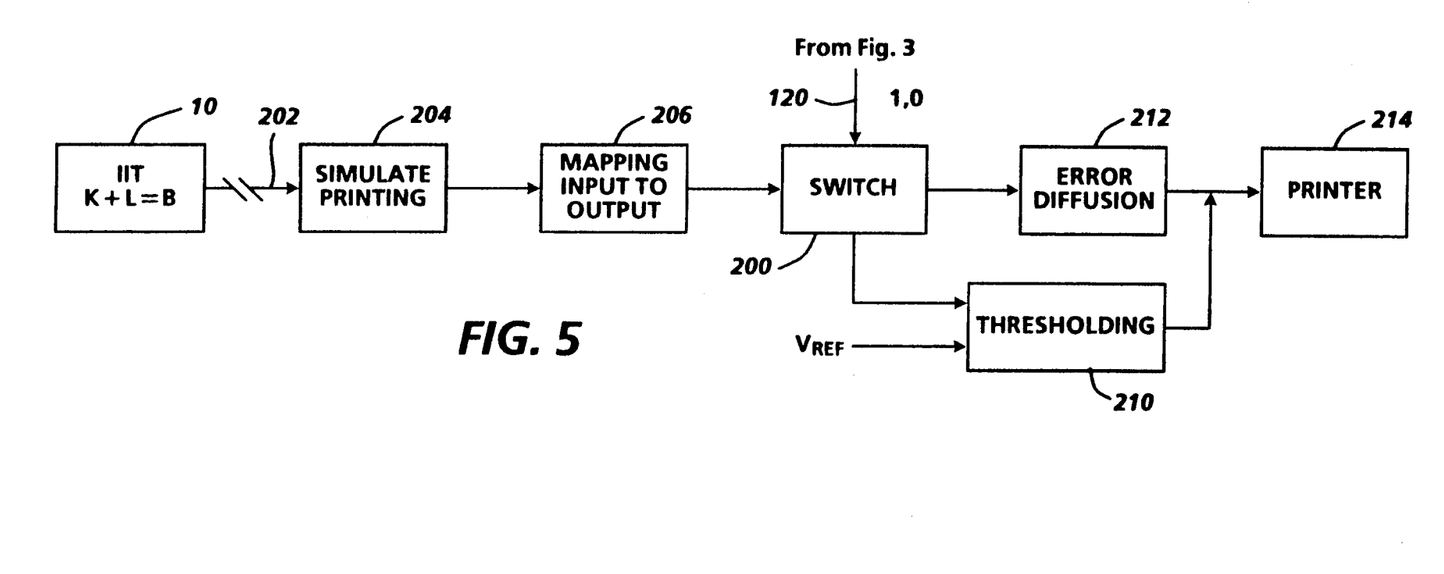
FIG. 5 shows the functional incorporation of the text/picture determination into the resolution conversion process.

With reference now to FIG. 5, in the present embodiment, a binary correlation signal on line 120 is the control signal for operating switch 200, which serves to select which quantization process in the resolution conversion process will be used. With respect to FIG. 5 and reference to U.S. patent application Ser. No. 07/821,125 entitled "Method for Image Conversions With Error Diffusion", by R. Eschbach, (EPC 0 481 812 A2) which produces gray level pixel values which require conversion to a limited set of "legal" or output values, one possible process for resolution conversion includes the functional elements of input receiving document images from IIT 10 at resolution conversion input 202. Next, at block 204, printing on the original printer for which the document was prepared is simulated to determine the effects on the document therefrom. It is assumed that the original image prepared represents a document that the user wants to print. Printing simulation serves to create an intermediate image that takes into account any special operations, such as dot shape or process functions which may have determined image appearance when initially prepared, and therefore removes the special accommodations made for those operations in the image data. Next, at block 206, signals of the simulated printed image are scanned with a simulated scanner having the resolution related to the output print. This places the image at the desired resolution, but produces gray values at the accuracy of the system. In one possible mode of operation, this step is represented by a weighted mapping of input pixels to output pixels, depending on the relative amounts of overlap.

In accordance with the invention, and depending on the selection of switch 200, image signals representing the image at the new resolution $M \times N$ are passed through a non-strictly density preserving thresholding operation 210. In one embodiment, this thresholding operation compares the signal generated at block 206 with a reference $V_T$ and sets the output pixel responsive to said comparison, making dark pixels darker and light pixels lighter, i.e. increasing the contrast for textual image data. In a second embodiment the thresholding is performed in an adaptive manner similar to the method taught in MAE (Minimum Average Error) method of error diffusion described in "Images from Computers", by M. Schroeder, IEEE Spectrum, March 1969, pp. 66–78. Here, the decision is dependent on a fixed number of neighboring pixels and non-density preserving, in contrast to the error diffusion taught by Floyd and Steinberg, where all past neighbors influence the local decision and density is preserved. Alternatively, for low correlation, an error diffusion operation 212 is used, which maintains and distributes error in the thresholding process through the image similar to the method of Floyd and Steinberg.

Figure 6:
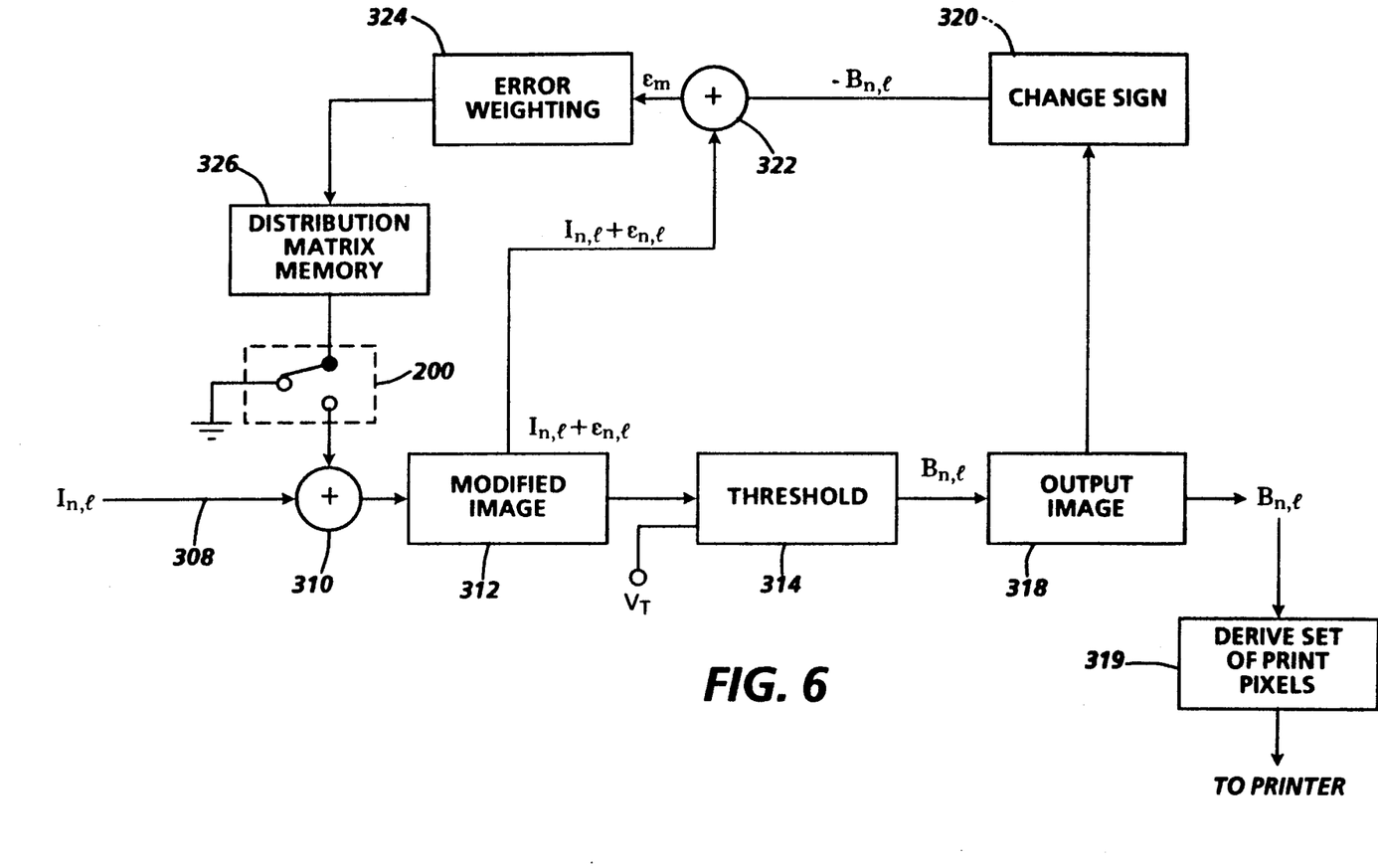
FIG. 6 shows a possible functional description of the error diffusion process for quantization, in which provision is made for the thresholding of text.
Figure 7:
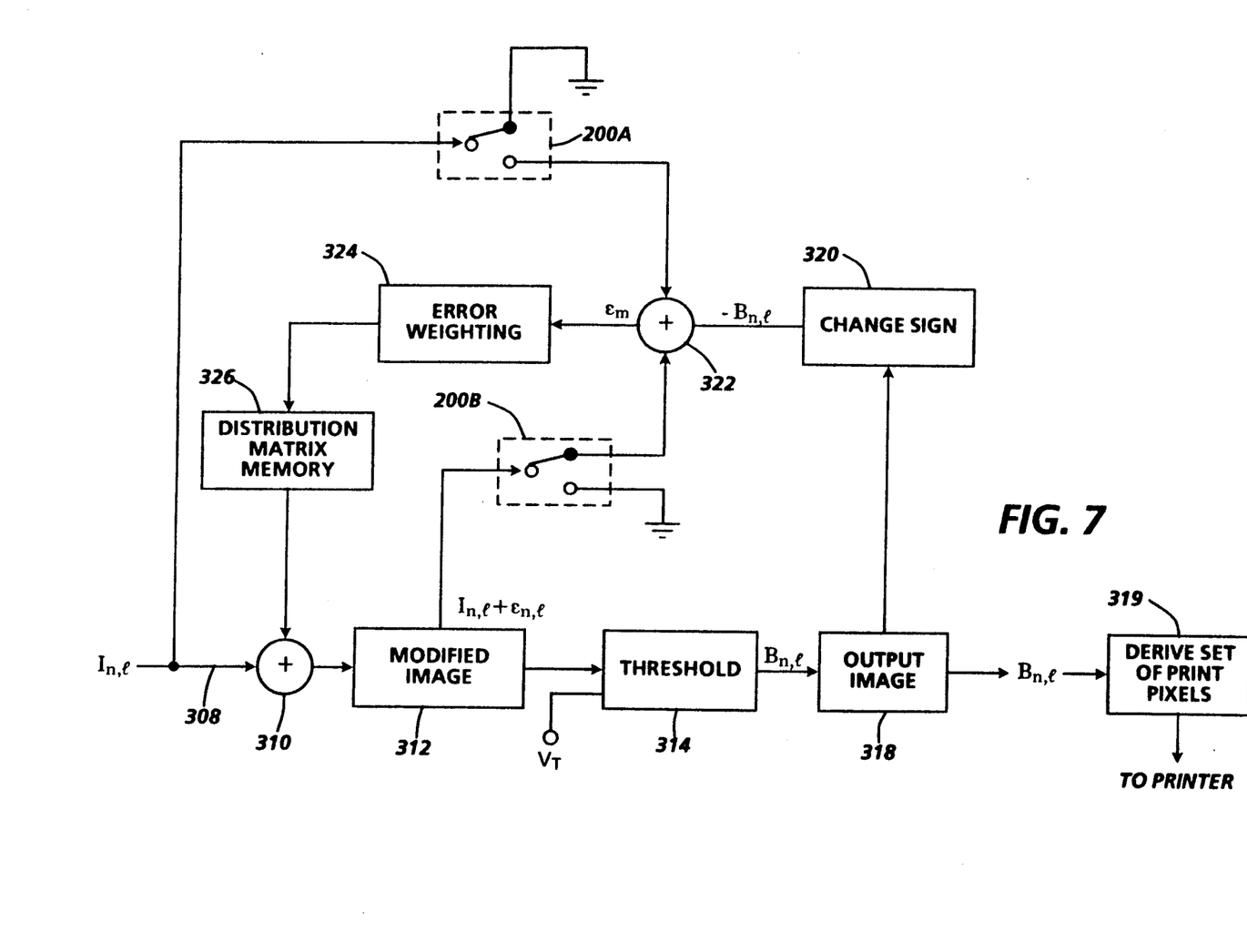
FIG. 7 shows a possible functional description of the minimum average area process for quantization, in which provision is made for thresholding text.

With reference now to FIGS. 6 and 7, two embodiments of the switching and quantization blocks of FIG. 5 are shown, which incorporate the present invention. In FIG. 6, a thresholding implementation is illustrated, with an input signal from IIT 10 is directed to image input 308, which introduces input document I into the system on a pixel-by-pixel basis. Each input signal $I_{n,l}$ which represents a pixel of the document, has a corresponding error signal $\epsilon_{n,l}$ added thereto at signal adder 310, where $\epsilon_{n,l}$ is a sum of error signals of previous pixels, resulting in a modified pixel, represented by modified image signals temporarily stored at pixel register 312. The modified image, which is the sum of the input signal and the error signal of previous pixels $(I_{n,l} + \epsilon_{n,l})$ is passed to threshold comparator 14. The modified image signal is compared to threshold reference signal $V_T$, to determine an appropriate output signal $B_{n,l}$ for pixel $I_{n,l}$. The threshold value(s) applied $V_T$ may be constant through the image or may vary either randomly, or in accordance with a dither pattern, as taught in "On the Error Diffusion Technique for Electronic Halftoning" by Billotet-Hoffmann and Bryngdahl, Proceedings of the SID, Vol. 24/3, (1983), pp. 253–258, or in accordance with input information as taught in U.S. Pat. No. 5,045,952 to Eschbach, or in accordance with any other predetermined variation.

Once output signal $B_{n,l}$, a signal suitable for driving printer 214, is determined and directed to output image register 18 for eventual transfer to the printer at output 319, the value of $B_{n,l}$ is subtracted from the modified image value $(I_{n,l}+\epsilon_{n,l})$ to generate the quantization error level $\epsilon_m$ from quantizing pixel $(I_{n,l}+\epsilon_{n,l})$. The subtraction operation is represented by the change sign block 320 and subsequent signal adder 322, with $\epsilon_m$ representing the difference between the modified image value $(I_{n,l}+\epsilon_{n,l})$ and the output signal $B_{n,l}$ for pixel $I_{n,l}$. Error term $\epsilon_m$ is then distributed at error determination block 324 to a predetermined set of neighboring pixels in accordance with a predetermined scheme. The distribution matrix buffer 326 represents a set of registers receiving stored values which will be used as weighting coefficients to generate $\epsilon_{n,l}$ as any pixel n,l that passes. Switch 200 is functionally located between distribution matrix buffer 326 and adder 310, and serves to switch the source of error values from buffer 326 to a fixed reference signal of value '0', i.e. no signal is forwarded to adder 310 to be added to image 308.

In FIG. 7, where elements common with the structure of FIG. 6 are like numbered, the implementation using the non-density-preserving MAE method is shown. Here, switches 200A and 200B are operated simultaneously with the results of the correlation determination, enabling either the error calculation according to the MAE method (non-density-preserving) with 200A closed and 200B grounded or the error calculation according to Floyd and Steinberg (density preserving) with 200A grounded and 200B closed.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A color printing system for printing color documents from image signals, said color documents each including a plurality of separations, each separation prepared with a set of image signals at a first resolution of K spots per inch × L spots per inch, including means for converting said color documents from said first resolution to a second resolution of M spots per inch × N spots per inch, comprising:

a source of image signals representing optical density within a discrete area of a separation at the first resolution;

first means for converting said image signals from the first resolution to the second resolution, while preserving gray density within an image area processed;

second means for converting image signals from the first resolution to the second resolution, without preserving gray density within the image area processed;

switching means, responsive to an image content signal, for selectively connecting one said first and second means, to said image signal source;

means for determining for a selected document area, whether said selected document area includes correlated image signals or non-correlated image signals, said determining means producing an image content signal directed to said switching means upon said determination, said image content signal connecting said first means to said image signal source when the images are pictorial images indicated by non correlated image signals, and to connect said second means to said image signal source when the images are text/line images indicated by correlated image signals; and a printer, operatively connected to said first and second means, driven to print a color document in accordance with said image signals at the second resolution of M spots per inch × N spots per inch.

2. A device as defined in claim 1, wherein said second means includes a thresholding means for comparing said image signals to a reference signal and producing a printer signal indicating that the optical density of the discrete area of the image was darker or lighter than a reference density.

3. A device as defined in claim 1, wherein said second means includes a non-density preserving quantizer comparing a modified image signal to a reference signal, producing a printer signal indicating that the modified density of the discrete area of the image was darker or lighter than a reference density, and adding the difference between the printer signal and the original, unmodified image density to a specified neighborhood, thereby generating modified optical densities in said neighborhood.

4. A device as defined in claim 1, wherein said first means includes an error diffusing quantizer comparing said image signals to a reference signal, producing a printer signal indicating that the optical density of the discrete area of the image was darker or lighter than a reference density, and adding the difference between the printer signal and the image signal to each of a plurality of unprocessed image signals spatially adjacent thereto within the document.

5. A device as defined in claim 1, wherein said correlation determining means producing an image content signal to said switching means upon said determination includes:

separation correlation means for determining whether image signals within a separation and within the selected document area have a uniform gray value, and producing a separation correlation signal indicative thereof; and document correlation means operatively connected to said separation correlation means to receive each separation correlation signal and producing an image content signal responsive thereto.

6. A device as defined in claim 4, wherein said document correlation means produces an image content signal indicating correlation when said separation correlation signals concurrently indicate a uniform gray level.

* * * * *